United States Patent [19]

Salemka et al.

[11] Patent Number: 4,976,091
[45] Date of Patent: Dec. 11, 1990

[54] METHOD AND APPARATUS FOR FILLING TUBES

[75] Inventors: Mark E. Salemka; James W. Lorenzen, both of Adrian, Mich.

[73] Assignee: Wacker Silicones Corporation, Adrian, Mich.

[21] Appl. No.: 341,086

[22] Filed: Apr. 20, 1989

[51] Int. Cl.⁵ .......................... B65B 1/48; B65B 3/24; B65B 3/30; B65B 7/28
[52] U.S. Cl. ....................................... 53/467; 53/474; 53/503; 53/486
[58] Field of Search ................. 141/95, 198, 128, 105, 141/107; 29/437; 53/432, 471, 472, 474, 503, 504, 510, 88, 486, 266 R, 267, 282

[56] References Cited

U.S. PATENT DOCUMENTS

| | | | |
|---|---|---|---|
| 2,653,135 | 9/1953 | Sterling | 53/474 X |
| 3,324,904 | 6/1967 | Crothers | 141/86 |
| 3,618,171 | 11/1971 | Zecher | 18/30 AR |
| 3,621,892 | 11/1971 | Gillespie | 141/107 X |
| 3,843,601 | 10/1974 | Bruner | 260/46.5 G |
| 4,011,929 | 3/1977 | Jeram et al. | 188/268 |
| 4,019,242 | 4/1977 | Zook et al. | 53/471 X |
| 4,019,562 | 4/1977 | Shiraiwa et al. | 141/95 X |
| 4,141,470 | 2/1979 | Schulte et al. | 141/107 X |
| 4,261,397 | 4/1981 | Guy | 141/198 X |
| 4,307,760 | 12/1981 | Häuser | 141/95 X |
| 4,407,431 | 10/1983 | Hutter, III | 141/107 X |
| 4,437,497 | 3/1984 | Enander | 141/1 |
| 4,458,735 | 7/1984 | Houman | 141/95 |
| 4,480,730 | 11/1984 | Koller et al. | 29/437 X |
| 4,485,856 | 12/1984 | Dulian et al. | 141/198 |
| 4,559,979 | 12/1985 | Koblasz et al. | 141/198 X |
| 4,572,253 | 2/1986 | Farmer et al. | 141/95 |
| 4,686,271 | 8/1987 | Beck et al. | 528/15 |
| 4,711,277 | 12/1987 | Clish | 141/128 X |
| 4,733,381 | 3/1988 | Farmer et al. | 367/93 |
| 4,737,037 | 4/1988 | Mojonnier | 141/105 X |

Primary Examiner—Horace M. Culver

[57] ABSTRACT

Apparatus and method for filling open-ended tubes to a level below the top of the open end of the tube with a hydraulic silicone elastomer wherein a first composition and a second composition are provided to a static mixer and the mixture is supplied to the tube. The level of the elastomer in the tube is sensed by an ultrasonic sensor. When the desired predetermined level of the elastomer in the tube is reached, a signal from the ultrasonic sensor terminates the flow into the tube. The filling rate includes a fast fill rate followed by a dribble rate. The tube is vertically adjustable relative to the level sensor, and an adjustable tube stop provides a precise level adjustment.

13 Claims, 2 Drawing Sheets

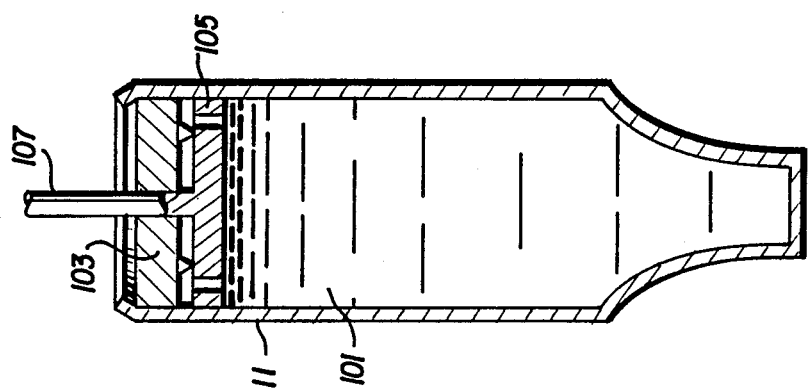
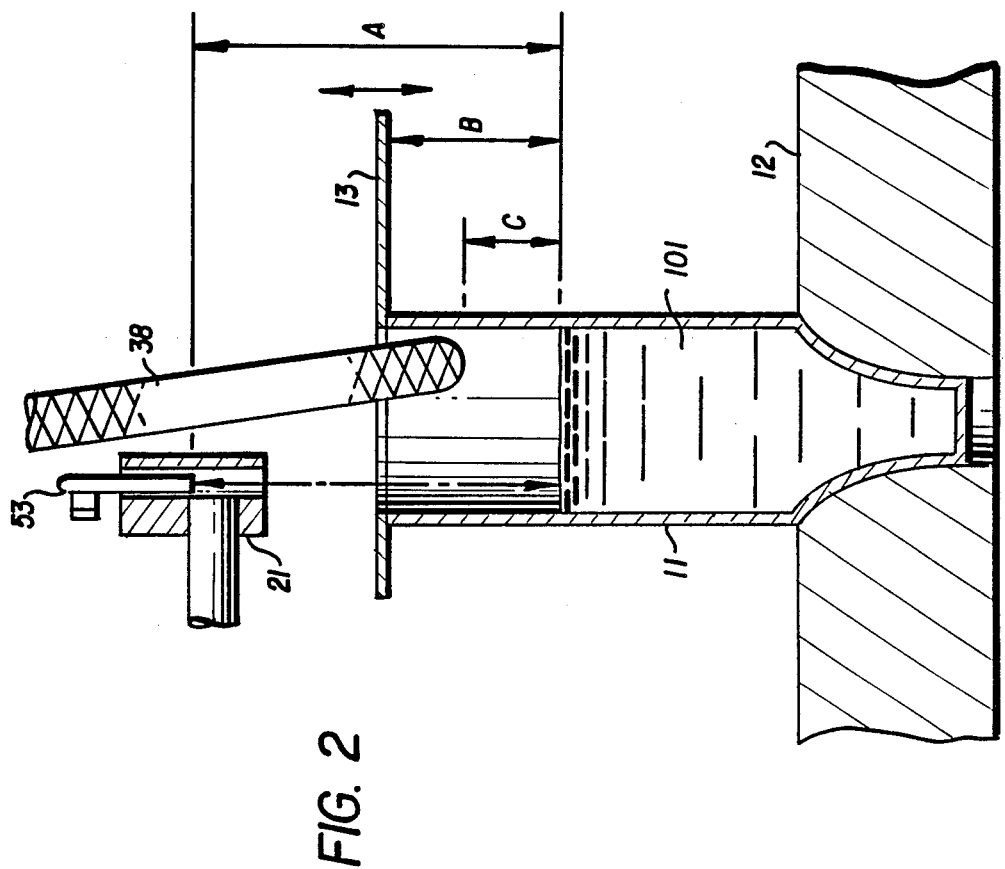

METHOD AND APPARATUS FOR FILLING TUBES

The present invention relates generally to a method and apparatus for filling tubes with a material, and more specifically relates to the filling of tubes used in a dampening device with material wherein the level within the tube is precisely measured.

An example of a dampening device using a particular material is shown in U.S. Pat. No. 4,011,929 issued Mar. 15, 1977. This particular device uses a compressible solid, fragmented, articulate mass of cured, unfilled silicone rubber composition for producing a dampening effect on the piston and head of the device. FIG. 2 of this patent illustrates one dampening device of the general type with which the present invention is primariy concerned.

Problems arise in the filling of these dampening devices with the particular material so as to assure that consistency of operation is provided for all such dampening devices produced.

It has been considered desirable to fill the tubes of such devices with a liquid rather than a solid before they are closed. In this case, a liquid is used which may be cured so as to become a solid which will produce a dampening effect on the piston rod and head. With any such systems that are known, the liquid filler must be cured by the application of heat. This requires a substantial amount of additional equipment in an production line and also requires extra steps in the operation.

A further problem which presents itself when filling the tubes relates to the ultimate attachment of the piston within the tube so that a predetermined pressure is applied to the piston by the final composition after the manufacture of the dampening device is completed. It is essential that these predetermined pressures be the same for each dampening device produced since the operation of the device requires that, for accuracy, such pressures have substantially no variance. Accordingly, after the tubes have been filled, each placement of the piston within the tube requires that pressure on the piston be accurately measured and the position of the piston adjusted until such proper pressure is applied before the device is sealed.

Since the tubes are mass-produced and do not have extreme tolerances as to their interior volumes, a volumetric measuring system for filling the tubes does not assure that the level of the compound within the tube will be the same for each tube. This results in different levels within the various tubes and requires the procedure discussed above relating to the measuring of the pressure.

Accordingly, it is an object of this invention to provide a composition for filling the tubes which will cure without the additional application of heat.

Another object of this invention is to supply two different materials which are mixed at the point of dispensing of the material into the tube, with such mixture causing the curing of the material shortly after it has been placed within the tube.

A further object of the present invention is to provide an extremely accurate means for measuring the level of the material being dispensed into the tube and terminating the dispensing of the material when the level reaches a predetermined distance below the open end of the tube.

A still further object of this invention is to provide means for filling tubes of the type discussed above to a predetermined level below the open end of the tube by means of ultrasonically measuring the distance of the level of the liquid relative to the top of the open end of the tube.

These and other objects of the invention will become apparent from the following description, taken together with the drawings.

SUMMARY OF THE INVENTION

A method and apparatus is provided for filling an open-ended tube to a predetermined level below the top of the open end of the tube with material that is mixed at the point of filling the tube and which cures within the tube without the application of additional heat. Two separate materials are provided to the mixer and are mixed and dispensed by the mixer. The dispensing takes place at a rapid rate of filling. After a predetermined period of time, the dispensing rate is reduced and the tube is filled at the end of the cycle at a slower rate. The level of the fluid below the top of the open end of the tube is measured by an ultrasonic sensor. When the level of fluid reaches a predetermined distance below the top of the tube, as measured by the sensor, the dispensing is terminated.

BRIEF DESCRIPTION OF THE DRAWINGS

FIG. 2 is a cross-sectional view of a tube and the mixer, dispenser, and ultrasonic sensor; and FIG. 3 is a cross-sectional view of a completed dampener.

DETAILED DESCRIPTION OF THE PREFERRED EMBODIMENT

Figure 1:
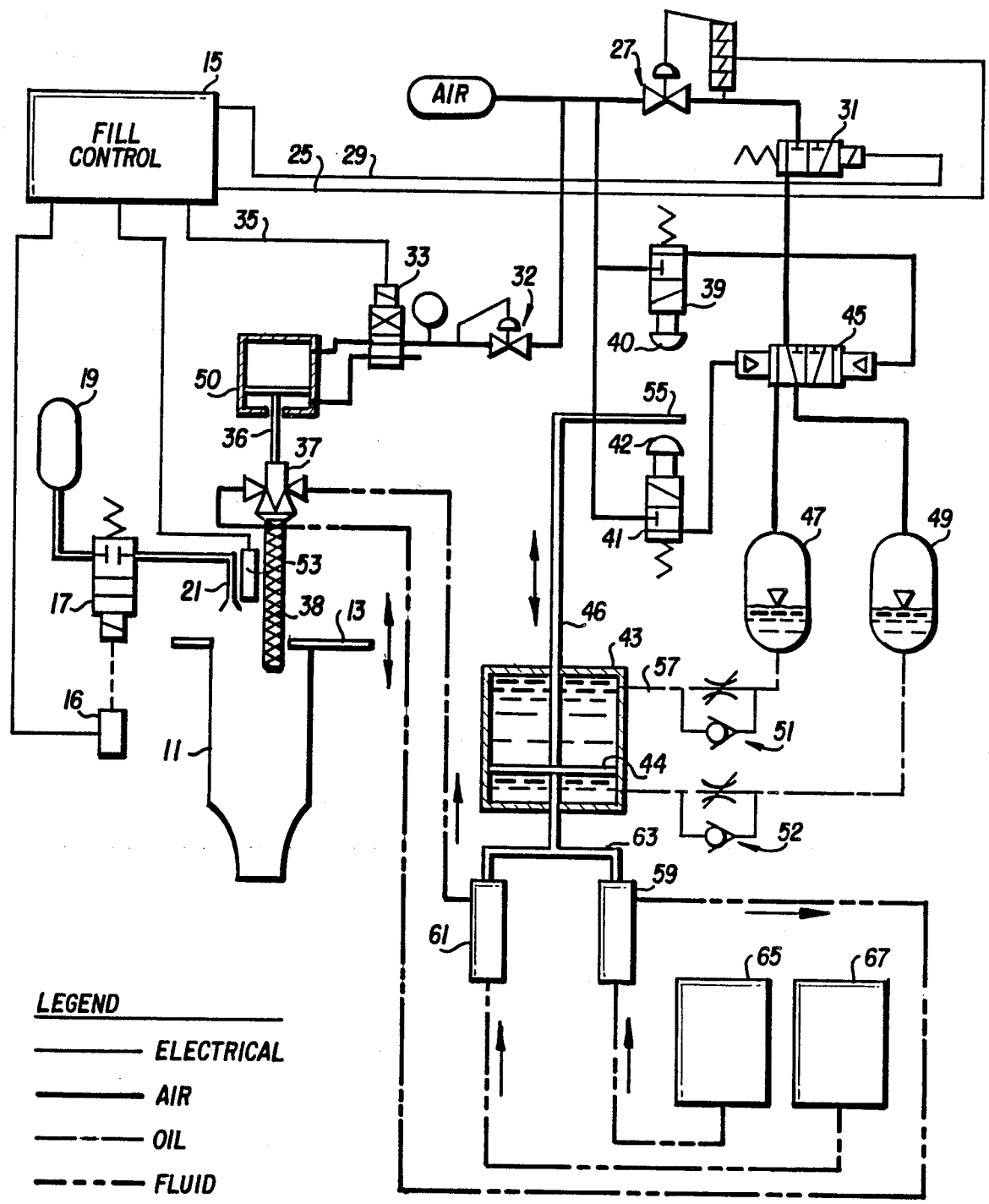
FIG. 1 is a schematic diagram of the overall system of the present invention.

Turning now to FIG. 1, there is shown a schematic of the overall system used in the present invention.

Tube 11 is moved to a position against adjustable stop 13. Adjustment of stop 13 may be made by any of the well known techniques used in machine shops, such as worm gear (not shown). This assures that the upper open end of tube 11 will be maintained at an equal distance from the ultrasonic sensor used during the filling process. After tube 11 is in position, fill control 15 (a standard control using programs and tuning controls) initiates a start-to-fill signal, at which time the following events occur.

Nitrogen purge valve 17 is actuated by means of solenoid 16, which permits nitrogen gas from tank 19 to flow out of purge nozzle 21. The nitrogen gas purge stream is directed along the path of ultrasonic sensor 53 into tube 11. This purge gas is used, as is normally known, to maintain a pure atmosphere so as not to allow contaminants to affect the ultrasonic beam.

The initial signal for the fill rate is sent to air pressure regulator 27. Simultaneously a signal is sent to pump actuation valve 31, which is part of the air pressure actuation system. Additionally, fill control valve 33 is actuated, by air pressure regulator 32, which pressurizes dispense valve 37 to the full operative position by means of pump 50.

During the fill operation, pneumatic position switches 39 and 41 control pump 43 by means of pump direction control valve 45 and hydraulic flow control valves 51 and 52.

When position stop 55 of pump 43 abuts against contact 40 of pneumatic position switch 39, an air signal is sent to the right side of pump directional control valve 45, which moves to the left, venting accumulator 49 and applying the regulated air pressure to accumulator 47. This pressure pumps hydraulic oil from accumulator 47 into the top side of pump 43, which causes a downward movement of piston 44. The hydraulic oil from the bottom side of pump 43 is forced out of pump 43 and through hydraulic flow control valve 52 to accumulator 49. When position stop 55 abuts against contact 42 of pneumatic position switch 41, pump direction control valve 45 moves to the right, which thus vents accumulator 47 and pressurizes accumulator 49. Pressurized accumulator 49 pumps hydraulic oil into the bottom side of pump 43, causing an upward movement of piston 44. The upward movement of piston 44 forces hydraulic oil out of the top of pump 43 through hydraulic control valve 51 and into accumulator 47. Thus, it can be seen that piston 44 in pump 43 is constantly reciprocating so as to create a motion on the shaft, which is secured to and moved with piston 44.

It should be noted that the speed of the upward motion of piston 44 is controlled by the air pressure applied through accumulator 49 and the setting of hydraulic flow control valve 52. Likewise, the downward motion of piston 44 is controlled by the air pressure applied to accumulator 47 and the setting of flow control valve 51.

The resulting upward/downward motion of piston 44 is transmitted to slaved piston pumps 59 and 61 by means of connecting bar 63.

Piston pumps 59 and 61 pump fluids regardless of the direction of movement of piston 44; therefore, the upward/downward motion of piston pump 59 will pump the material from tank 65 to the left side of dispense valve 37. In the same manner, the upward/downward motion of piston pump 61 will pump material from tank 67 to the right side of dispense valve 37. Upon activation of fill control valve 33, which opens dispense valve 37, the mixtures of the materials from tanks 65 and 67 are proportionately pumped into mixing nozzle 38, where the two parts are mixed together before exiting mixing nozzle 38 and entering container 11.

Dispensing valve 37 is commercially available from Liquid Control Corporation under the trademark TWINFLOW MINI II. The pumping system is commercially available from Fluid Automation. This system has been modified to include the air system as shown and described.

At the end of a predetermined time delay which is set into fill control 15, the control system sends a further signal to air pressure regulator 27 to reduce the air pressure applied to accumulators 47 and 49. The reduced air pressure will reduce the speed of the upward/downward movement of pump 43, thus reducing the material flowing from tanks 65 and 67 to tube 11.

With the flow reduced, the level of the material in tube 11 is detected by ultrasonic sensor 53. (Ultrasonic sensor 53 and the associated equipment is available from Beltron Corporation.) When a predetermined and preset level is reached, ultrasonic sensor 53 sends a stop filling signal to fill control 15. Upon receipt of the stop signal from ultrasonic sensor 53, the following sequence occurs.

Pneumatic fill control valve 33 is deactivated, which closes dispense valve 37 and causes a snuffback of the material in mixing nozzle 38.

Nitrogen purge valve 17 is deactivated, thus shutting off the nitrogen gas to purge nozzle 21.

Pump actuation valve 31 is deactivated, venting the currently active accumulator (either 47 or 49, depending upon the direction of the piston in pump 43 at the moment of shutoff). This venting occurs through valve 31.

It should be noted that one of the primary advantages of the present system is that the shutoff signal will occur whenever ultrasonic sensor 53 detects the level at the set point. This holds true regardless of the fill rate mode.

When the sequence is completed and the filled tube is removed, a new, empty tube is put into fill position, at which time the fill cycle is repeated.

Turning to FIG. 2, a detailed cross-sectional view of representative fill components is shown. As can be seen, tube 11 is supported by base 12. Adjustable stop 13 is positioned so as to coordinate the distance between ultrasonic sensor 53 and the upper edge of tube 11. The arrows from ultrasonic sensor 53 indicate a standard ultrasonic technique of reflecting ultrasonic impulses to and from the surface of the material. With the desired level of the material in tube 11 being known, the distance between the ultimately desired finished level of material in the tube (that is, distance A) can be adjusted with adjustable stop 13 since the top of tube 11 abuts against adjustable stop 13. In comparison, the distance between the bottom of adjustable stop 13 and the ultimate material level is indicated as distance B. The distance C between the bottom of the dispenser and the level of the material is not critical since the dispenser never touches the fluid.

A preferred arrangement of the dispenser relative to the tube is shown in FIG. 2. Mixing nozzle 38 is inclined at an angle so that when the material is being dispensed at the higher rate under the first stage of the program, it will strike the edge of the interior wall of tube 11 and pass downwardly as it is filling the tube. It has been found that this prevents accumulation of air and/or bubbles within the fluid which would tend to affect the upper level of the material and, thus, present a false indication of the filling of the tube. When the flow rate is reduced for the last stage of the filling operation, it is such that the liquid no longer touches the wall but dribbles into the tube, providing a slower rate of filling. This also allows time for any of the material which is collected on the side walls of the tube to flow downwardly into the liquid.

As is obvious, ultrasonic sensor 53 is positioned vertically above the material so as to obtain a proper reading. Again, a nitrogen purge is used to eliminate any possible variations of the measurement due to contaminants in the air.

Various liquid materials which may be cured to form a solid and which are easily deformed may be used to fill the tubes. The cured material is easily compressed, extrudes well, provides a constant pressure, readily flows under pressure, and can be repeatedly recycled.

Materials which may be employed in the method and apparatus of this invention to form damping devices are silicone compositions, epoxy resins, and urethanes.

The silicone compositions consist of (A) crosslinkable organopolysiloxanes or modified organopolysiloxanes, (B) a crosslinking agent, and (C) a catalyst, if desired.

The organopolysiloxanes (A) employed in the filling composition may be a diorganopolysiloxane having the general formula $R^1(SiR_2O)_xSiR_2R^1$ in which R represents the same or different monovalent hydrocarbon radicals, substituted monovalent hydrocarbon radicals having from 1 to 18 carbon atoms and monovalent hydrocarbon radicals having aliphatic unsaturation, $R^1$ represents hydroxyl groups, or monovalent hydrocarbon radicals having aliphatic unsaturation, and x is a number greater than 10.

Examples of hydrocarbon radicals represented by R are alkyl radicals such as the methyl, ethyl, n-propyl, and the isopropyl radicals, as well as octadecyl radicals; alkenyl radicals such as the vinyl and the allyl radicals; cycloaliphatic hydrocarbon radicals, such as the cyclopentyl and cyclohexyl radicals, as well as the methylcyclohexyl and cyclohexenyl radicals; aryl radicals such as the phenyl and xenyl radicals; aralkyl radicals such as the benzyl, beta-phenylethyl and the beta-phenylpropyl radicals and alkaryl radicals such as the tolyl radical.

Examples of substituted hydrocarbon radicals represented by R are haloaryl radicals such as the chlorophenyl and bromophenyl radicals; and the cyanoalkyl radicals, such as the betacyanoethyl radical.

Examples of monovalent hydrocarbon radicals represented by $R^1$ having aliphatic unsaturation are vinyl and allyl radicals.

The diorganopolysiloxanes have from about 1.8 to 2.2 organic groups per silicon atom and more preferably from about 1.9 to about 2.0 organic groups per silicon atom.

The viscosity of the diorganopolysiloxanes employed in the compositions of this invention may range from about 50 to 50,000 mPa.s at 25° C., and more preferably from 100 to 20,000 mPa.s at 25° C.

The hydroxyl-terminated organopolysiloxanes and their methods of preparation are described, for example, in U.S. Pat. No. 2,607,792 to Warrick and U.S. Pat. No. 2,843,555 to Berridge.

Other organopolysiloxanes which may be employed are organopolysiloxanes having organic polymers which are linked by chemical bonding to organopolysiloxanes, including diorganopolysiloxanes, and which represent graft polymers or block copolymers or those formed in the presence of organopolysiloxanes by the polymerization of at least one organic compound having at least one aliphatic carbon-carbon double bond.

Examples of organopolysiloxanes containing organic polymers are organopolysiloxane-polyolefins, organopolysiloxanepolystyrene, organopolysiloxane-polyacrylates, organopolysiloxane-polyamides, organopolysiloxane-polycarbonates, organopolysiloxane-polyethers, organopolysiloxane polycarbodimides, organopolysiloxane-polyurethanes and organopolysiloxane-poly(ethylene-vinyl acetate).

Several of the polymers which are chemically linked to organopolysiloxanes, or which are at least formed in the presence of organopolysiloxanes by the polymerization of at least one organic compound having at least one aliphatic carbon-carbon double bond, are described in U.S. Pat. No. 3,155,109 to Getson; U.S. Pat. No. 3,627,836 to Getson; U.S. Pat. No. 3,631,087 to Lewis et al; U.S. Pat. No. 3,694,478 to Adams; U.S. Pat. No. 3,776,875 to Getson; U.S. Pat. No. 3,794,694 to Chadha et al; and U.S. Pat. No. 4,032,499 to Kreuzer et al.

The organopolysiloxanes having terminal hydroxyl groups are crosslinked by crosslinking agents (B) such as polyalkoxysilanes of the formula $(R^3O)_nSiR^2_{4-n}$ or polyalkoxysiloxanes in which the silicon atoms are linked through Si-O-Si linkages and the remaining valences of the silicon atoms are satisfied by $R^2$ and $R^3O$ radicals and catalysts. In the above formula, $R^2$ is a monovalent hydrocarbon radical or a halogenated monovalent hydrocarbon radical having from 1 to 10 carbon atoms, $R^3$ is a monovalent hydrocarbon radical having from 1 to 10 carbon atoms, and n is 3 or 4.

The polyalkoxysilanes employed herein include monoorganotrihydrocarbonoxysilanes, tetrahydrocarbonoxysilanes and partial hydrolyzates thereof. Specific examples of polyalkoxysilanes are alkyl silicates, such as ethyltrimethoxysilane, methylbutoxydiethoxysilane, propyltripropoxysilane, methyltriethoxysilane, ethyltriethoxysilane, tetraethyl orthosilicate and tetra-n-butyl orthosilicate. Examples of organopolysilicates are ethylpolysilicate, isopropyl polysilicate, butyl polysilicate and partially hydrolyzed ethyl silicates such as "ethyl silicate 40," which consists primarily of decaethyltetrasilicate. Examples of polyalkoxysiloxanes are dimethyltetraethoxydisiloxane, trimethylpentabutoxytrisiloxane and the like. The polyalkoxysilanes and polyalkoxysiloxanes employed herein may be used either alone or in combination.

The crosslinking agents (B) capable of reacting with the hydroxyl groups of the diorganopolysiloxanes are preferably employed in an amount of from about 0.5% to about 20% by weight and more preferably from about 1% to 10% by weight based on the weight of the diorganopolysiloxanes having hydroxyl groups.

When the crosslinking agent (B) is a polyalkoxysilane or polyalkoxysiloxane, then it is preferred that catalysts, such as metallic salts of organic carboxylic acids be employed. Examples of suitable acid radicals are those which yield the acetate, the butyrate, the octoate, the laurate, the linoleate, the stearate and the oleate. The metal ion of the metallic salt may consist of lead, tin, zirconium, antimony, iron, cadmium, barium, calcium, titanium, bismuth and manganese. Examples of suitable salts are tin naphthenate, lead octoate, tin octoate, iron stearate, tin oleate, antimony octoate, tin butyrate and the like. Other catalysts which may be used are bis-(acetoxy-butyl-phenyltin)oxide, bis-(acetoxydibutyltin)oxide, bis-(tributyltin)oxide, bis-[tris-(o-chlorobenzyl)-tin] oxide, di-t-butyl dibutoxytin, tris-t-butyltin hydroxide, triethyltin hydroxide, diamyl dipropoxytin, dibutyltin dilaurate, dioctyltin dilaurate, diphenyloctyltin acetate, dodecyldiethyltin acetate, trioctyltin acetate, triphenyltin acetate, triphenyltin laurate, triphenyltin methacrylate, dibutyltin butoxychloride and the like.

The amount of catalyst used may range from about 0.05% to about 10% by weight, preferably from about 0.1% to 2% by weight based on the weight of the composition. A mixture of two or more of the catalysts enumerated above may be used, if desired.

Organopolysiloxane compositions which are crosslinked by the addition of Si-bonded hydrogen to an aliphatically unsaturated carbon-to-carbon group may also be used in the process and apparatus of this invention. The diorganopolysiloxane may be represented by the formula $R^1(SiR_2O)_xSiR_2R^1$ where R and x are the same as above and $R^1$ is an aliphatically unsaturated radical.

These organopolysiloxanes are essentially linear polymers containing diorganosiloxane units of the formula $R_2SiO$; however, they may also contain minor amounts, generally not more than about 2 mol percent of other units, such as $RSiO_{3/2}$ units, $R_3SiO_{0.5}$ and/or $SiO_{4/2}$ units, in which R is the same as above. Included specifically in the above formula are the dimethylpolysiloxanes, methylphenylpolysiloxanes, methylvinylpolysiloxanes, and copolymers of such units, such as copolymers containing dimethyl- and phenylmethylsiloxane units and copolymers containing phenylmethyl-, dimethyl- and vinylmethylsiloxane units. These organopolysiloxanes are well known and their methods of preparation are well known in the art.

The organopolysiloxanes preferably contain at least 0.1 weight percent vinyl radical and more preferably from 0.1 to about 1 weight percent vinyl radical based on the weight of the organopolysiloxane.

These organopolysiloxanes preferably have a viscosity of from about 5 to 50,000 mPa.s at 25° C. and more preferably from about 50 to about 30,000 mPa.s at 25° C.

Organohydrogenpolysiloxanes employed as crosslinking agents (B) in the compositions of this invention generaly consist of units of the general formula $$R^4{}_mSiO_{(4-m/2)}$$

where $R^4$ represents hydrogen, a monovalent hydrocarbon radical or a halogenated monovalent hydrocarbon radical having from 1 to 18 carbon atoms, in which at least two and preferably three Si-bonded hydrogen atoms are present per molecule and m is 1, 2, or 3. Preferred compounds are those consisting of $R^4SiO_{1.5}$ units, $R^4{}_2SiO$- and $R^4{}_3SiO_{0.5}$- units, in which a Si-bonded hydrogen atom is present for each 3 to 100 silicon atoms and $R^4$ is the same as above. It is preferred that the organohydrogenpolysiloxanes have a viscosity of from about 10 to 20,000 mPa.s and more preferably from about 100 to 10,000 mPa.s at 25° C.

The organohydrogenpolysiloxanes may also contain monovalent hydrocarbon radicals having aliphatic unsaturation as well as Si-bonded hydrogen atoms in the same molecule.

It is preferred that the organohydrogenpolysiloxanes contain from 0.1% to about 1.7% by weight of hydrogen atoms, and the silicon valences not satisfied by hydrogen atoms or siloxane oxygen atoms are satisfied by monovalent hydrocarbon radicals and substituted monovalent hydrocarbon radicals free of aliphatic unsaturation. The preferred organohydrogenpolysiloxanes are the trimethylsiloxy-endblocked polymethylhydrogensiloxanes and those most preferred have from 0.25 to about 1.5 weight per cent silicon-bonded hydrogen atoms.

The platinum catalysts which are employed in these compositions may consist of finely dispersed platinum as well as platinum compounds and/or platinum complexes which have been used heretofore to promote the addition of Si-bonded hydrogen atoms to compounds having aliphatically unsaturated groups.

Examples of catalysts which can be used in this invention are finely dispersed platinum on carriers, such as silicon dioxide, aluminum oxide or activated charcoal, platinum halides, such as $PtCl_4$, chloroplatinic acid and $Na_2PtCl_4.nH_2O$, platinumolefin complexes, for example, those with ethylene, propylene or butadiene, platinum-alcohol complexes, platinum-styrene complexes such as those described in U.S. Pat. No. 4,394,317 to McAfee et al, platinum-alcoholate complexes, platinum-acetylacetonate, reaction products comprising chloroplatinic acid and monoketones, for example, cyclohexanone, methylethylketone, acetone, methyl-n-propyl ketone, diisobutyl ketone, acetophenone and mesityl oxide, as well as platinum-vinyldisiloxane complexes with or without a detectable amount of inorganic halogen.

In addition to the organopolysiloxane (A) and crosslinking agents (B), the compositions of this invention may also contain other additives which have been used heretofore in curable organopolysiloxane compositions.

Other additives which may be employed in the compositions of this invention are reinforcing fillers, i.e., fillers having a surface area of at least 50 $m^2/g$. Examples of such fillers are precipitated silicon dioxide having a surface area of at least 50 $m^2/g$ and/or pyrogenically produced silicon dioxide. Examples of other reinforcing fillers are the aerogels and alumina.

A portion of the fillers can be semi- or non-reinforcing fillers, i.e., fillers which have a surface area of less than 50 $m^2/g$. Examples of semi- or non-reinforcing fillers are bentonite, diatomaceous earth, crushed quartz, mica and mixtures thereof.

The amount of fillers which may be incorporated in the compositions of this invention may vary over a wide range. Thus, the amount of filler may range from about 0 to 100 per cent by weight and more preferably from about 0 to 50 per cent by weight, based on the weight of the weight of the organopolysiloxane. Preferably, fillers are not present in these compositions in that they will interfere with the deformation and flowability of organopolysiloxanes.

It is essential that the various components of the two-component systems be kept separate; otherwise, curing will begin immediately. Generally, the crosslinking agent (B) or catalyst (C) is kept separate from the organopolysiloxane (A) and then mixed just prior to filling the tube.

Referring to FIG. 1, the crosslinkable organopolysiloxanes (A) are stored in tank 65 and the crosslinking agent (B) and catalyst (C) are stored in tank 67. The materials are proportionately pumped into mixing nozzle 38, where they are mixed together and introduced in container 11.

The ingredients (A), (B) and (C) are then cured by letting the tubes stand at room temperature or by heating to an elevated temperature. The compositions used in this invention are easily deformed. It is preferred that the cured compositions have a hardness as determined with a Shore A durometer in accordance with ASTM-395, Method B, of from about 0 to 80, and more preferably from about 10 to 30.

Urethane compositions which are easily deformed may be used in the process and apparatus of this invention. The urethanes are obtained by reacting an organic polyisocyanate with a compound having at least two groups bearing a Zerewitinoff-active hydrogen atom. General discussions of typical reactions of organic isocyanates and compounds having active hydrogen atoms are presented in the following review articles:

Chem. Rev. 43, pp. 207–211 (1948);

Chemistry of Organic Isocyanates, HR-2, Elastomers Division, E. I. du Pont de Nemours and Co., Inc., Wilmington 98, Delaware; and Chem. Rev. 57, pp. 47–76 (1957).

In general, these hydrogen atoms are attached to carbon, oxygen, nitrogen or sulfur atoms. Compounds containing one or more of the following groups will have active hydrogen atoms: acetamido, primary amino, secondary amino, amido carbamyl, carboxyl, diazoamino, hydrazino, hydrazo, hydrazono, hydroxamino, hydroxyl, imido, imino, isonitro, isonitroso, mercapto, nitroamino, oxamyl, sulfamino, sulfamyl, sulfino, sulfo, thiocarbamyl, triazino, ureido, ureylene, and urethaneo groups. Most often these active hydrogen atoms are attached to oxygen, nitrogen, or sulfur atoms; thus, they will be a part of groups such as —OH, —SH, —NH—, —NH$_2$, —CO$_2$H, —CONH$_2$, —CONHR''', where R''' represents an organic radical, —SO$_2$OH, —SO$_2$NH$_2$, —CSNH$_2$. Representative examples of these compounds include the aliphatic polyols, hydroquinone, 1,2-ethanedithiolm, mercapto-ethanol, p-aminophenol, piperazine, ethanolamine, propylenediamine, hexamethylenediamine, ethylenediamine, m-phenylenediamine, toluene-2, 4-diamine, cumene-2, 4-diamene, 4,4'-methylene-dianiline, 4,4'-methylenebis(2-chloroaniline), urea, guanidine, aminopropionic acid, β-hyroxypropionic acid, succinic acid, adipic acid, 4-hydroxybenzoic acid, terephthalic acid, isoterephthalic acid, 4-aminobenzoic acid, N-β-hydroxyethyl propionamide, succinamide, adipamide, 4-aminobenzamide, sulfanilamide, 1,4-cyclohexanedisulfonamide, 1,3-propanedisulfonamide, and 1,2-ethanedisulfonic acid. Polymers containing urethaneo

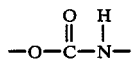

and ureido

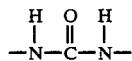

groups may also be employed in the present invention.

Urethane compositions and their methods of preparation are described in, for example, U.S. Pat. No. 2,650,212 to Windemuth, U.S. Pat. No. 2,770,615 to Schollenberger, U.S. Pat. No. 2,778,810 to Muller, U.S. Pat. No. 2,814,834 to Stillmar, U.S. Pat. No. 3,012,992 to Pigott et al, and U.S. Pat. No. 3,001,973 to Piepenbunk et al.

Epoxy compounds which may be used in the present inventon are well known in the art. The most widely used epoxy resins are those obtained from the reaction of epichlorohydrin with bisphenol A(4,4'-isopropylidenediphenol). Other polyols such as aliphatic glycols and novoloc resins can be used instead of the bisphenol.

Other types of epoxy resins which may be employed are those obtained from the epoxidation, with peroxy compounds, of double bonds in certain Diels-Alder adducts.

Glycidyl ether resins, which are obtained from the reaction of epichlorohydrin with polyhydric materials, may also be employed in the present invention. Generally, the epichlorohydrin is reacted with a polyol at temperatures up to about 150° C. in the presence of alkaline or other type catalysts.

Epoxy resins require the addition of a curing agent or hardener in order to convert them to thermoset materials. A great variety of chemical agents can be used as hardeners or curing agents. Curing agents most commonly used are amines such as aliphatic and aromatic amines, polyamides, tertiary amines and amine adducts; acidic types of curing agents such as acid anhydrides and acids; aldehyde condensation products such as phenol-, urea-, and melamine-formaldehyde resins and Lewis acid types of catalysts such as boron trifluoride complexes.

In the following examples, all parts and percentages are by weight unless otherwise specified:

EXAMPLE 1

A silicone composition is prepared by adding 1000 parts of a dimethylvinyl terminated dimethylpolysiloxane having a viscosity of 2000 mPa.s at 25° C. into tank 65 and 100 parts of a methylhydrogenpolysiloxane having a viscosity of 50 mPa.s at 25° C. and 10 parts of chloroplatinic acid are introduced into tank 67. The materials from tanks 65 and 67 are proportionately pumped into mixing nozzle 38, where the two parts are mixed together and introduced into container 11. The material cured at room temperature and at atmospheric pressure to form a soft, deformable elastomer.

EXAMPLE 2

(a) A silicone composition is prepared by mixing 192 parts of a trimethyl terminated organopolysiloxane having 0.2 per cent by weight of pendant vinyl groups and having a viscosity of 2000 mPa.s at 25° C. with 8 parts of a platinum catalyst prepared in accordance with U.S. Pat. No. 4,394,317. The mixture is introduced into tank 67.

(b) An organohydrogenpolysiloxane fluid having a viscosity of about 50 mPa.s at 25° C. and containing about 1.0 per cent by weight of hydrogen as Si-bonded hydrogen is introduced into tank 67.

(c) The materials from tank 65 and 67 are proportionally pumped in a ratio of 90 parts of the mixture from tank 65 and 10 parts of the organohydrogenpolysiloxane from tank 67. The materials are pumped into mixing nozzle 38, where the two parts are mixed together and introduced into container 11. The material cured at atmospheric pressure and at room temperature to form a soft, deformable elastomer.

EXAMPLE 3

A silicone composition is prepared by adding 1000 parts of a hydroxyl-terminated organopolysiloxane having a viscosity of 2000 mPa.s at 25° C. to tank 65. Fifty parts of ethyl silicate "40" (40% SiO$_2$) and 10 parts of dibutyltin butoxychloride are added to tank 67. The materials from tanks 65 and 67 are proportionately pumped into mixing nozzle 38, where the two parts are mixed together and introduced into container 11. The material cured at room temperature and at atmospheric moisture to form a soft, deformable elastomer.

Turning now to FIG. 3, a cross-sectional illustration of the finished product of the type which is used in a bumper shock absorber for automobiles is shown. Tube 11 is shown as containing material 101 in its finally cured condition. As described above, the level of the material below the upper edge of the tube is exactly the same regardless of variations in the dimensions of the interior of the tube. This allows cap 103 and associated perforate piston 105 to be inserted a specific distance into the tube so that the piston is adjacent the surface of material 101. This specific distance is arrived at by determining the pressure desired on vented piston 105, which is the constant pressure for the inactivated shock absorber. After the cap and piston are inserted, with piston rod 107 secured to vented piston 105, cap 103 is secured to tube 11 by crimping the upper part of the tube about the cap, as shown. Thus, cap 103 is in a fixed position, while piston rod 107 may move up and down through cap 103. Accordingly, any pressure on piston rod 107 creates movement of perforate piston 105 and absorbs the shock in the normally known manner.

The above description and associated drawings are descriptive, only, since the equivalent components could be substituted without departing from the invention, the scope of which is to be limited only by the following claims.

I claim:

1. A method for filling an open tube to a predetermined level below its open end with an admixture of two interacting compounds comprising
    mounting an open tube substantially vertically, with the open end of the tube facing upwardly;
    mixing a first and second compound adjacent said mouth of said tube;
    partially filling said tube with the admixture of said compounds at a first fill rate;
    reducing the fill rate of said admixture into said tube;
    ultrasonically measuring the surface level of said admixture below the open end of said tube; and
    terminating the flow of said admixture when the level within the tube reaches a predetermined level below the open end of said tube.

2. The method of claim 1 further comprising
    curing said admixture in said tube;
    placing a movable perforate piston adjacent the surface of said admixture; and
    sealing said tube above said piston.

3. The method of claim 1 wherein said admixture comprises
    a silicone composition.

4. The method of claim 3 wherein said silicone composition comprises
    vinyl-containing organopolysiloxanes, an organohydrogenpolysiloxane, and a catalyst which promotes crosslinking of the silicone composition.

5. The method of claim 4 wherein said catalyst is a platinum catalyst.

6. The method of claim 1 wherein said admixture is a urethane composition.

7. The method of claim 1 wherein said admixture is an epoxy compound.

8. Apparatus for filling an open tube to a predetermined level below its open end comprising
    means for mounting an open tube substantially vertically, with the open end of the tube facing upwardly;
    a mixing and dispensing valve mounted above said tube;
    an ultrasonic liquid level sensor mounted adjacent said valve at a fixed distance above the open end of said tube for measuring the level of the fluid in said tube;
    a source of a first material;
    first means for pumping said first material from said source to said valve at a predetermined rate;
    a source of a second material;
    second means for pumping said second material to said valve at a predetermined rate, said valve mixing said materials and dispensing the admixture into the tube;
    means for reducing the pumping rate of said first and second means at the end of a predetermined time delay so as to reduce the flow of said first and second material to said valve; and
    means for terminating the flow of said admixture from said mixing and dispensing valve when a predetermined level of said admixture in said tube is sensed by said ultrasonic liquid level sensor.

9. The apparatus of claim 8 wherein said admixture comprises
    a silicone composition.

10. The apparatus of claim 9 wherein said silicone composition comprises
    vinyl-containing organopolysiloxanes, an organohydrogenpolysiloxane, and a catalyst which promotes crosslinking of the silicone composition.

11. The apparatus of claim 10 wherein said catalyst is a platinum catalyst.

12. The apparatus of claim 8 wherein said admixture is a urethane composition.

13. The apparatus of claim 8 wherein said admixture is an epoxy compound.

* * * * *